A. W. WESSOLECK.
WINDSHIELD CLEANER.
APPLICATION FILED JAN. 25, 1921.
1,375,878.
Patented Apr. 26, 1921.
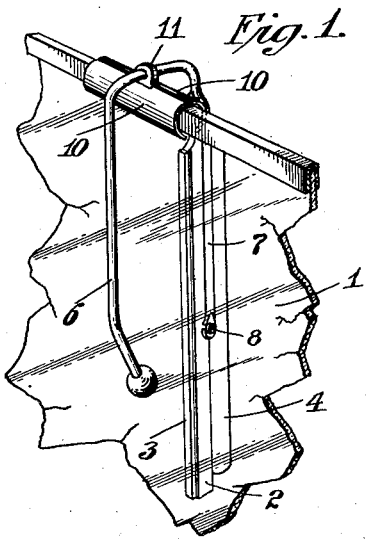
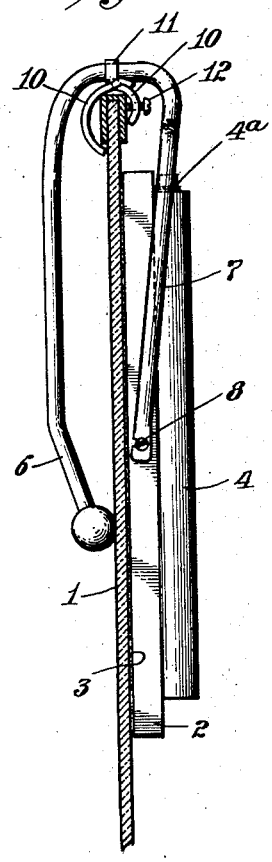
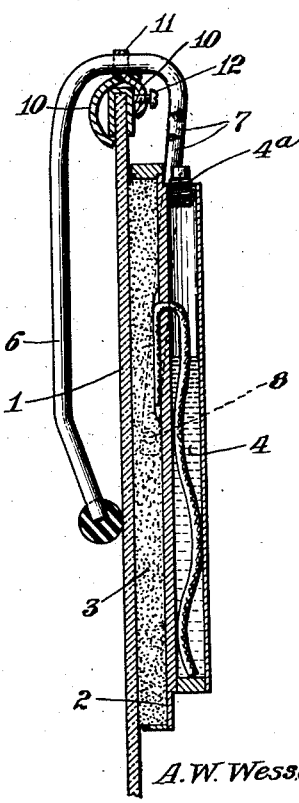
INVENTOR
A. W. Wessoleck
BY
ATTORNEYS

UNITED STATES PATENT OFFICE.

AUGUSTUS W. WESSOLECK, OF NEW BRITAIN, CONNECTICUT.

WINDSHIELD-CLEANER.

1,375,878.

Specification of Letters Patent.   Patented Apr. 26, 1921.

Application filed January 25, 1921.   Serial No. 439,873.

*To all whom it may concern:*

Be it known that I, AUGUSTUS W. WESSOLECK, a citizen of the United States of America, residing at New Britain, Hartford county, Connecticut, have invented a new and useful Windshield-Cleaner, of which the following is a specification.

My invention relates to a new and improved device for keeping a section of a windshield clean in stormy weather.

In the drawings:—

Figure 1 is a perspective view of a portion of a windshield showing my improved cleaner in place.

Fig. 2 is a sectional view relatively enlarged.

Fig. 3 is an edge elevation.

It is well known that raindrops and snowflakes tend to accumulate on the glass or windshield to the great inconvenience and danger of a driver of a vehicle. The object of my invention is to provide a simple and effective means which will not only permit the rain or snow to be wiped off a section of the windshield, but to simultaneously apply thereto any suitable liquid which will tend to repel the accumulation of snowflakes and raindrops thereon. 1 represents that portion of a windshield glass which it is desired to keep clear. The cleaner proper comprises a channeled piece 2 having therein a suitable wiper strip 3 preferably of porous material, such as felt, the edge of which strip projects beyond the channel. Adjacent to the channeled portion 2 is a well or reservoir 4 having a suitable stopper 4ª. The well is designed to receive a suitable liquid which, if applied to the glass of a windshield, will tend to repel the accumulation thereon of rain drops or snowflakes. In order to apply and distribute this liquid thinly and evenly, I provide means for slowly conveying said liquid to the strip 3. This I find may be successfully accomplished by means of a wick which passes through an opening in a wall and the channel 2, preferably near the upper end thereof. A suitable piece of wicking, for example, is passed through said opening, one end extending into the channel and the other end extending down to the bottom of the well 4. This wicking serves to convey the liquid from the well to the strip slowly and evenly as required.

Suitable means is, of course, provided to support the cleaning device or wiper to enable the operator to move it over that section of the glass which it is desired to keep clean. Such supporting and operating means may be any one of a great many, but I have shown herein, an exceedingly simple form which may be readily employed with the ordinary windshield construction. This particular supporting means comprises a hanger in the form of heavy bent wire having a handle end 6 bent down inside of the windshield. This wire extends over the top of the windshield and down on the outside thereof, the lower outer end being formed into a yoke providing two forked arms 7—7 which straddle the cleaning device and which may be pivotally connected to the middle portion thereof as by means of pivot screws 8—8. The yoke ends may be slotted if desired, so that when it is desired to refill the well 4, it may be removed very readily from the holder.

Any suitable bracket bearing may be provided for the holder. In the present instance, I have shown two jaws 10—10, one of which is provided with a lug 11, which passes through an opening in the other jaw. 12—12 are clamping screws. The wire handle portion passes through an opening in the lug 11, so that it may be swung thereon as a bearing. With this type of a holder, a semi-circular section of the windshield may be wiped clean and simultaneously treated with the rain drop and snowflake repelling liquid.

As I have before indicated, the form of the holder for the cleaner is immaterial to the invention in its broadest aspect. If desired, the handle end 6 of the holder may have a ball-shaped head piece thereon, which may bear frictionally against the inside of the windshield in such a manner as to hold the cleaner against the outer side of the windshield glass with sufficient snugness to prevent rattling, and also with sufficient snugness to permit it to stand in any position in which it is left, that is to say, if the operator wishes to have the cleaning device stand at one side when he is not actually using the same, he may swing it to that position where it will remain by friction.

The well is preferably in the form of a long tube which is arranged at the back of the channel, so that the chief dimension of the cleaning device is length. By this means, the device as a whole is so narrow that it will not obstruct vision to any marked degree.

While I have referred to wicking as a means for transferring the liquid from the well to the wiper strip, it should be understood that I intend thereby to include any other suitable means therefor.

What I claim is:—

1. In a windshield cleaner, a channeled portion, a wiper strip located therein and projecting beyond the edge thereof, a well carried by said channeled portion for containing liquid, means for conveying liquid by capillary action from said well to said channeled portion and to said wiper strip, means for supporting said cleaner upon a windshield and in a substantially upright position, said means being movable whereby said strip may be moved laterally to clean the surface of said shield.

2. In a windshield cleaner, a channeled portion, a wiper strip located therein and projecting beyond the edge thereof, a well carried by said channeled portion for containing liquid, a wick for conveying liquid from said well to said channeled portion and to said wiper strip, comprising a passage from a point near the upper end of the well and above the liquid therein through the wall thereof and into said channel, said wick passing through said passage for transferring the liquid to the wiper strip by capillary action.

3. In a windshield cleaner, a channeled portion, a porous wiper strip located therein and projecting beyond the edge thereof, a well carried by said channeled portion for containing liquid, means for suspending said cleaner in a substantially upright position and for holding the strip portion thereof yieldingly against the surface of a windshield, said means being movable to permit said cleaner to be moved laterally relatively to said strip to wipe the surface of said shield, said means being connected to said cleaner intermediate its ends whereby the end pressure of said strip on said shield will be substantially balanced, and a wick for conveying the liquid in the well to the wiper strip by capillary action.

4. In a windshield cleaner, a channeled portion having a porous wiper strip therein projecting beyond the edge thereof, a well at the back of said strip for containing liquid, a wick for conveying liquid from said well to said strip, said wick passing through a perforation in the wall between said channel and well above the normal liquid level and relatively near the upper end thereof, a holder comprising a yoke having one arm arranged to bear against the inside of a windshield and having another arm arranged to engage the cleaner intermediate its length and at the outside of said windshield, said yoke being movable to permit the wiper strip to be moved laterally over the surface of the windshield.

5. In a windshield cleaner, a channeled portion having a porous wiper strip therein projecting beyond the edge thereof, a well at the back of said strip for containing liquid, a wick for conveying liquid from said well to said strip, said wick passing through a perforation in the wall between said channel and well above the normal liquid level and relatively near the upper end thereof, a holder comprising a yoke having one arm arranged to bear against the inside of a windshield and having another arm arranged to engage the cleaner intermediate its length and at the outside of said windshield, said yoke being movable to permit the wiper strip to be moved laterally over the surface of the windshield, the connection between said yoke and said cleaner being detachable to permit said cleaner to be renewed and refilled independently of the removal of the holder.

AUGUSTUS W. WESSOLECK.